July 12, 1960     R. J. VAN DE GRAAFF ET AL     2,945,141
UNIDIRECTIONAL HIGH-VOLTAGE GENERATOR
Filed Dec. 31, 1956     3 Sheets-Sheet 1
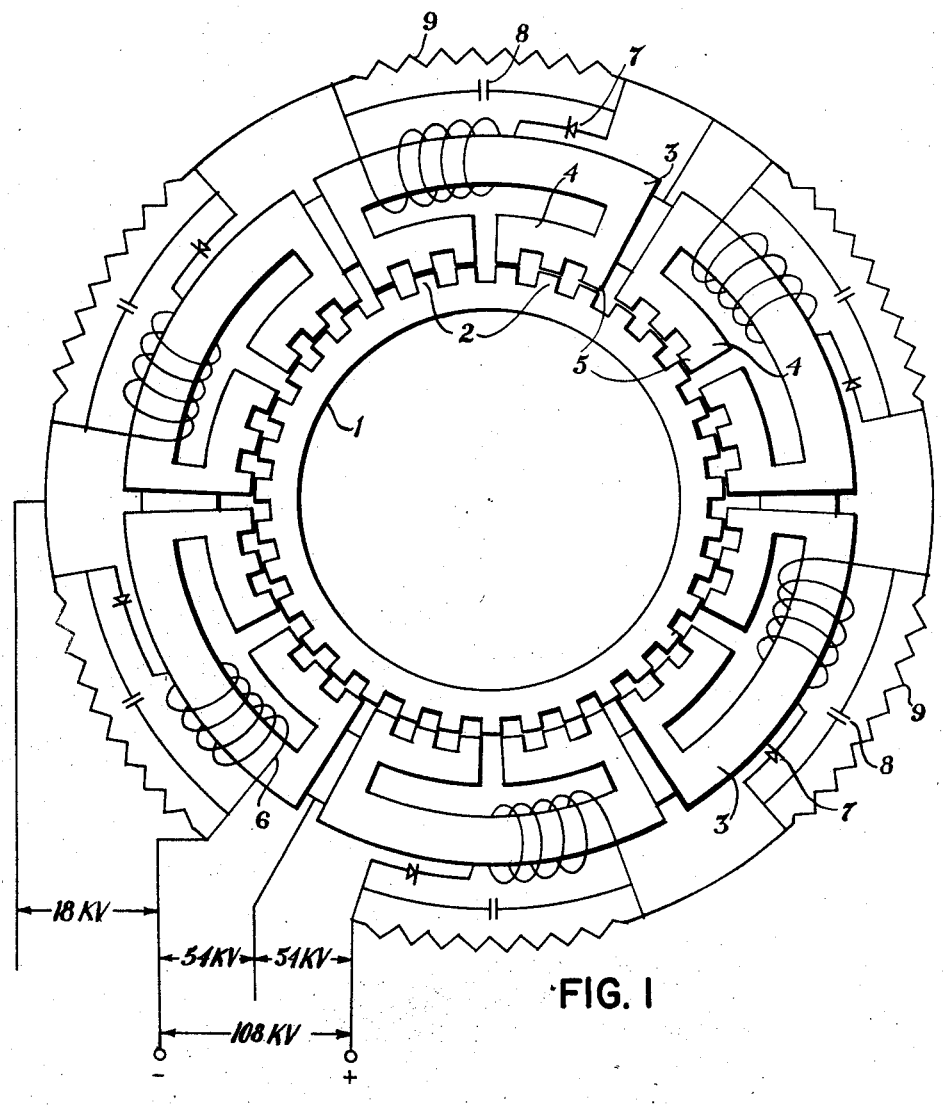
FIG. I

United States Patent Office 2,945,141
Patented July 12, 1960

2,945,141

UNIDIRECTIONAL HIGH-VOLTAGE GENERATOR

Robert J. Van de Graaff, Lexington, and John G. Trump, Winchester, Mass., assignors to High Voltage Engineering Corporation, Burlington, Mass., a corporation of Massachusetts Filed Dec. 31, 1956, Ser. No. 631,702

17 Claims. (Cl. 313—62)

This invention relates to the electromagnetic generation of unidirectional voltage, and in particular to electromagnetic D.C. generators in which maximum power output may be obtained from the space available for power production. The invention is especially adapted to the generation of high D.C. voltages at relatively high currents, but the invention is also advantageous in providing medium range D.C. voltage sources which are light, compact, and which can be tapped for any voltage up to the maximum voltage of the source.

The invention comprehends a D.C. generator unit of novel design in which a rotating element of magnetic material produces rapid variations in the reluctance of magnetic circuits each of which links one or more coils, thereby generating an A.C. E.M.F. in each coil. The A.C. output of each coil may be separately rectified, and the resultant D.C. outputs from each coil may be connected in series. A major objective of the invention is to provide a high-voltage D.C. generator comprising a plurality of such units arranged in series.

A principal application of the invention is its use as a source of radiation power. The demand for radiation power, such as cathode rays and X-rays is increasing. In applications such as the sterilization or preservation of foods and drugs and in radiation chemistry, high voltage sources are needed to provide adequate penetration of the matter irradiated. Moreover, this form of power is expensive: the initial capital cost of such radiation sources is hundreds of times greater than that required in the case of ordinary electric power. There is therefore an increasing demand for high voltage sources with high current outputs, principally in order to reduce the cost per kilowatt of the radiation power output of a single source.

A principal voltage source used today for the production of radiation power is the belt-type electrostatic generator. However, the current output of such generators is limited; and, in order to obtain more current, it is natural to turn to an electromagnetic generator of some sort.

The common variety of present-day electromagnetic D.C. generators are of the shunt-wound, field-wound or compound-wound flux-cutting type, and are provided with commutators. They are not adapted to the generation of high voltage in general, although some high voltage applications have been attempted, such as the Thury system in Europe, ten to fifty kilovolt generators for radio stations, etc. Thus, for example, a high voltage source might be constructed by arranging several conventional D.C. generators in a column in series, along the lines of the Thury system.

However, such conventional D.C. generators have commutators, and rectification by commutator limits the voltage attainable for various reasons. The alternative of rectification by means of a large high voltage vacuum tube is likewise unsatisfactory.

One obvious solution is to arrange several alternators, each of which is provided with a transformer-rectifier set or some voltage-multiplying circuit, in such a way that their rectified outputs add in series; however this use of conventional electromagnetic units which have been designed for other purposes does not provide the degree of compactness and economy needed to compete with modern electrostatic accelerators.

In the present invention, an alternative approach to the problem is pursued. Returning to fundamentals, a D.C. generator of a new type has been designed. This D.C. generator of new design is especially adapted to the generation of high voltage and to overcoming the aforementioned difficulties. The design of this new D.C. generator is also adapted to the medium voltage range where commutation is now sometimes used.

The invention may be best understood from the following detailed description thereof, having reference to the accompanying drawings, in which:

Fig. 1 is a plan view, somewhat diagrammatic, showing one form of a D.C. generator unit constructed in accordance with the invention;

Figure 6:
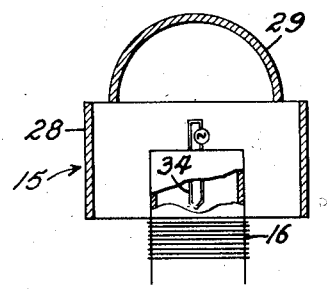
Fig. 6 is a detail, partly in vertical central section and partly in side elevation, of the high-voltage terminal of the apparatus shown in Fig. 4.

Referring to the drawings, and first to Fig. 1 thereof, each D.C. generator unit of the invention includes a rotating element or rotor 1, which is provided with a large number of teeth 2 on its outer periphery. The rotor 1 is composed of magnetic material, so that each tooth 2 corresponds to a magnetic pole. However, while an ordinary D.C. generator has, for example, two, four or six poles, the rotor 1 has many poles, and might have, for example, as many as 100 poles.

Surrounding the rotor 1 are a plurality of magnets 3, which may be excited by a field coil, or which may be permanent magnets, as shown in Fig. 1. The number of magnets 3 is not particularly important, but the pole faces 4 thereof are toothed, the teeth 5 of the magnets 3 being similar to the teeth 2 of the rotor 1.

If permanent magnets are used, the magnetic circuits must be laminated in the usual manner in order to avoid excessive eddy current losses. Alternative constructions of the magnets 3 will readily suggest themselves to those skilled in the art, and the invention is not limited to any particular type of magnet. For example, only a portion of each magnet 3 need be permanently magnetized for the purpose of providing the necessary excitation; or only one of the six magnets in each D.C. generator unit might be used as a field-excitation unit.

It will be observed from Fig. 1 that the rotor 1 serves to complete the flux path between the pole faces 4 of each magnet 3, and that the only air gaps in the magnetic circuit corresponding to each magnet 3 are those between each pole face 4 and the rotor 1. When the teeth 2 of the rotor 1 are opposite the teeth 5, of a given magnet 3, the air gap in the magnetic circuit corresponding to that magnet is very small; but when the teeth 2 of the rotor 1 are opposite the spaces between the teeth 5 of the magnet 3, the air gap is appreciable. Since the air gap constitutes most of the reluctance in the magnetic circuit, rotation of the rotor 1 causes a wide variation in the magnetic flux in the magnetic circuit.

Each magnet 3 is encircled by one or more coils 6, and the wide variation in the magnetic flux which links each such coil 6 generates an alternating E.M.F. in the coil. The A.C. voltage which thus appears across each coil 6 is then rectified by a suitable rectifier 7 and the ripple is smoothed by a condenser 8.

By increasing the number of teeth or poles 2 on the rotor 1, and by increasing the speed of rotation of the rotor 1, the frequency of the flux variation in the magnets 3 is increased, thereby giving more voltage and more power from each coil 6. Thus, a rotor having many poles would be capable of generating thousands of cycles per second. The simplicity of construction of the rotor 1 aids in enabling it to be rotated at such high speeds, for the rotor 1 has no windings on it and may be made to withstand strong centrifugal forces.

Owing to the rapid flux change, a good number of volts per turn is produced in the windings or coils 6, and it becomes advantageous to use frequent rectification. In the apparatus of Fig. 1, each coil 6 has its own rectifier; but in the limit, each turn could have its own rectifier. By using frequent rectification, massive alternating charging currents are avoided. In this way, it is possible to avoid the use of commutators or large, high voltage vacuum tubes. In fact, by placing a rectifier very close to each elemental A.C. generator, the rectifier is caused to act very much like a commutator, so that the apparatus of Fig. 1 constitutes an efficient D.C. generator in the medium voltage range. The apparatus of Fig. 1 thus cumulatively produces D.C., rather than cumulatively producing A.C.

It has already been indicated that, by frequent rectification, several very small rectifiers can replace a single bulky rectifier; and, in fact, the small rectifiers can be built into the unit. Moreover, it may not be necessary to use a separate condenser 8 to smooth the ripple, for the capacitance naturally existing between the components of the device may be sufficient to serve this purpose. It will be appreciated that the compactness of the device is greatly enhanced by these measures.

The required capacitance is greatly reduced by phasing the outputs of the coils 6. In the apparatus of Fig. 1, it will be observed that the spacing of the six magnets 3 from each other is such that there is a 60-degree phase difference between adjacent magnets. The required capacitance is thus only a fraction of that which would be required if all the magnets 3 were in phase with one another.

In order to bring the total voltage to zero when the generator is turned off, bleeder resistances 9 may be connected across each coil 6; but such bleeder resistances 9 are not otherwise an essential part of the invention.

Figure 2:
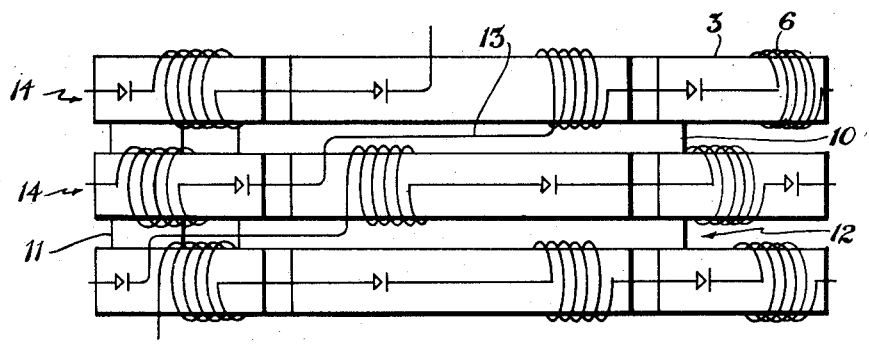
Fig. 2 is a side elevation, also somewhat diagrammatic, showing a high voltage D.C. generator comprising a stack of D.C. generator units of the type shown in Fig. 1, arranged in series in accordance with the invention.
Figure 3:
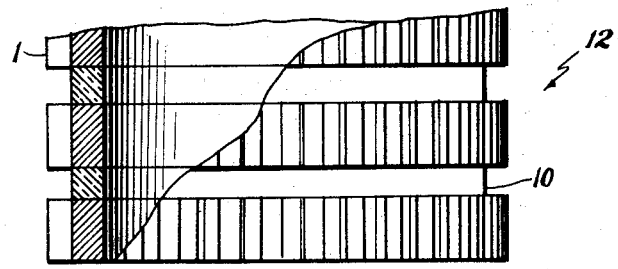
Fig. 3 is a view, partly in vertical central section and partly in side elevation, of the rotating part of the apparatus shown in Fig. 2.

The voltage output of the unit shown in Fig. 1 may readily be augmented by arranging a plurality of such units in series in the manner shown in Figs. 2 and 3. Referring to said Figs. 2 and 3, therein are shown several such units arranged in stack formation and separated by annular insulators 10, 11. The rotor assembly 12 is generally tubular in form, and comprises alternating rotors 1 and insulators 10 which may be cemented together to form a rigid, tubular unit. Each magnet 3 may be supported on the magnet immediately below it by a suitable insulating block 11. The low voltage coil 6 of each unit is connected to the high voltage coil of the unit next below it, as shown by the leads 13 in Fig. 2, so that the units are connected in series. Each coil 6 is staggered with respect to the coils immediately below and above it, as shown in Fig. 2, in order to reduce the axial distance required for a given voltage. Thus, the voltage-generating path may be made a great many times greater than the vertical distance. In the electrostatic belt-type generator, the voltage-carrying path is limited to the column length. If the apparatus is immersed in an insulating pressurized gas, with smooth surface, vertically adjacent coils may be as little as ¼ inch apart.

The magnets 3 of each unit are supported on or form part of an equipotential plane 14 which lies transverse to the axis of the rotor assembly 12 and at the center of the vertical width of each magnet 3. The toothed rotor 1 of each unit may be a single, equipotential plane; or each such rotor 1 may be subdivided into insulated sectors. Each such sector assumes, in succession, the potential of the adjacent magnet 3. In this way the path length to be insulated is increased as mentioned above. Since in this design both coils and magnetic structure have a geometry which is appropriate to the overall high voltage conformation of the generator, the need for Faraday cages is eliminated, thus substantially reducing space requirements.

As shown in Fig. 3, the construction of the rotor assembly 12 is quite similar to the construction of an acceleration tube; and, in fact, the rotor assembly 12 is adapted to have an acceleration tube mounted within it where the high voltage source of Figs. 2 and 3 is to be used to accelerate charged particles. Such an acceleration tube is shown at 16 in Figs. 4, 5 and 6. The rotor assembly 12 is driven by suitable means, as by the rotor of an induction motor, and the vacuum tube within the rotor assembly 12 may either be stationary, or may rotate with the rotor assembly, or the rotor assembly 12 may itself constitute the acceleration tube, as shown in Figs. 4 and 5.

By appropriate positioning of the magnets 3 with respect to the various rotors 1, a suitable off-phase relation may be established among the various units in addition to the off-phase relation, hereinbefore described, among the magnets 3 of each unit. Thus, if 10 units of 6 magnets each are properly phased, the capacitance required to reduce ripple to the desired extent will be only about 1/60 that required if all magnets are in phase. This would be of importance in producing radiation for certain purposes in nucleonics where it is highly important for the radiation produced to be extremely monoenergetic in character.

Many recent developments in various arts enhance the successful operation of the invention. One example is the development of efficient and reliable silicon diodes which make the rectification under these conditions much more feasible. Another example is the development of new magnetic materials which make possible the efficient operation of electromagnetic equipment of this type at frequencies of hundreds of cycles per second.

Figure 5:
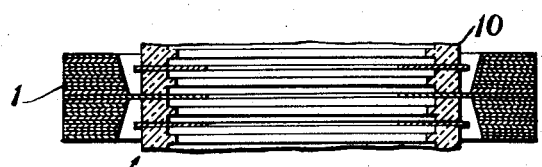
Fig. 5 is a view in vertical central section of a portion of the acceleration tube of the particle accelerator shown in Fig. 4.
Figure 4:
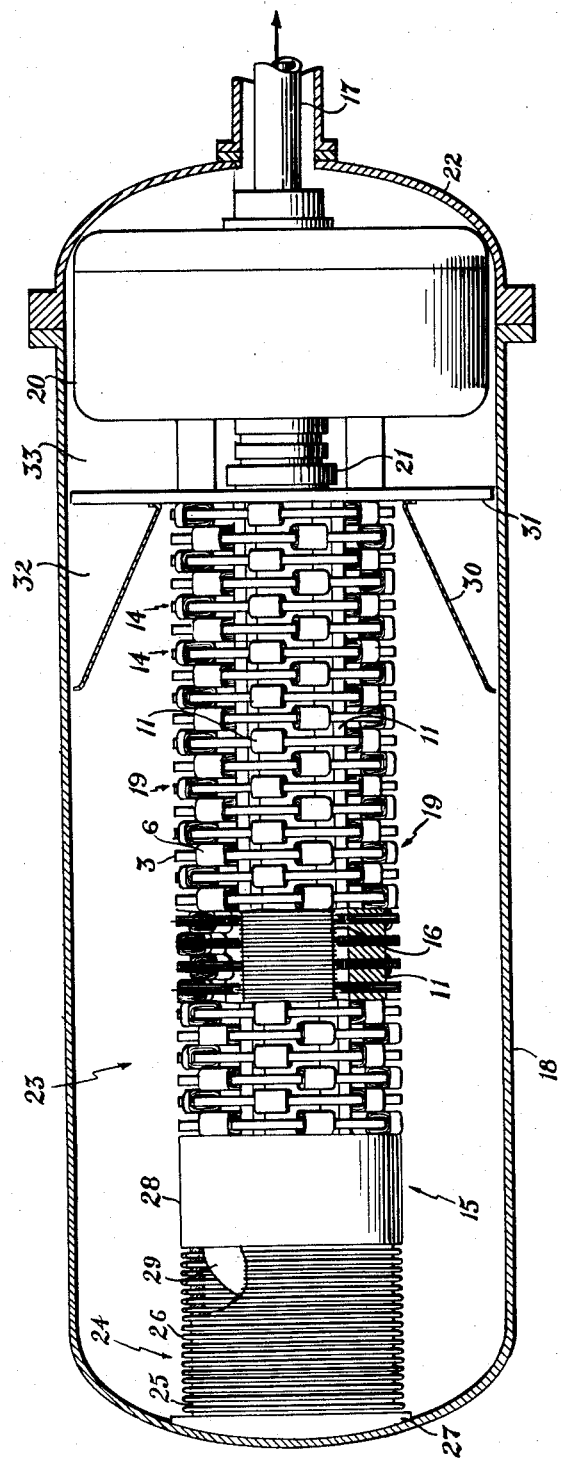
Fig. 4 is a view, partly in vertical central section and partly in side elevation, of a high voltage D.C. particle accelerator embodying the invention.

Referring now to Figs. 4 and 5, the high voltage D.C. particle accelerator therein shown includes a high voltage terminal 15 which is maintained at high voltage by the unidirectional voltage generator of the invention and an evacuated acceleration tube 16 through which charged particles are accelerated by the electric field generated by the generator from the high-voltage terminal 15 to the tube extension 17 which is at ground potential. As shown in Fig. 6, the acceleration tube 16 includes a charged particle source 34 at the extremity thereof which lies within the high voltage terminal 15. This charged particle source is shown in Fig. 6 as an electron-emitting cathode filament but may, of course, be either a source of positive ions or a source of negative ions or an electron source. In short, the acceleration tube 16 is of a type well known in the particle acceleration art and may accelerate any charged particles, and indeed may accelerate these particles either from the terminal to ground or from ground to terminal, depending upon the particular result desired. The high voltage parts of the apparatus are all enclosed in a tank 18 which is filled with an insulating gas at high pressure. The high voltage generator comprises a stack of D.C. generator units 19 of the type shown in Fig. 1, connected in series and arranged in longitudinal fashion about the acceleration tube 16. The acceleration tube 16 which comprises the rotor assembly of the high voltage generator, is driven by a motor 20 (preferably an induction motor) via a rotating coupling 21. The motor 20 is supported within the tank 18 upon the tank base 22.

The high voltage terminal 15 is supported, not only by the main column 23 of the high voltage generator, but also by an auxiliary column 24 comprising a series of alternating ring-shaped insulators 25 and ring-shaped metallic shields 26. The auxiliary column 24 fits between the terminal 15 and a guide assembly 27 in the top of the tank 18. The purpose of the guide assembly 27 is to guide the end of the auxiliary column 24 into position when closing the steel tank 18 and to apply compression to the main accelerator column 23.

In order to give a definite example, the particle accelerator shown in Figs. 4 and 5 may be considered to have a rated output of 3 million volts D.C. As can be seen, the generating column consists of 28 equipotential assemblies in series, each containing 6 small D.C. generator units in series. Thus there are a total of 168 of these small D.C. generator units, each of which has a rated output of 18 kilovolts D.C., as indicated in Fig. 1. If each of these small D.C. generator units has a rated output of 300 watts, then the output of the whole generator column in series would be 50 kilowatts at 3 million volts. In order to give an approximate scale to Fig. 4, it is expected that the tank diameter would be about equal to that of a standard 3-million-volt 3-kilowatt belt elastrostatic accelerator, which would correspond to a diameter of about 5 feet. Since the power output expected here would be increased far more than the cost, it is expected that the capital cost per kilowatt of this design would be many times less than that of the present 3-million-volt radiation source. Moreover, such an accelerator would have a D.C. voltage source made up of the sum of 168 voltage outputs in different phase, so that the high voltage supply should have very little ripple even with very little capacitor smoothing.

The reduction in cost per kilowatt of radiation output which is provided by the invention results from the special design of the particle accelerator shown in Figs. 4 and 5. In the first place, the accelerator of Figs. 4 and 5 makes an extremely efficient use of the space occupied by the apparatus. In the second place, the use of the acceleration tube as the rotor assembly of the high voltage generator results in numerous advantages which will be discussed in detail hereinafter. Thirdly, the main column 23 is very rigid in the transverse plane; this is important, because high power without rigidity leads to vibrations. Fourthly, high voltage units which attempt to arrange conventional electromagnetic apparatus in series need to resort to conductive shells or Faraday cages in order to reconcile the use of improper units; such shells constitute an inefficient use of space, and in the apparatus of Figs. 4 and 5 such shells are not only unnecessary but an undesirable complication.

As will be pointed out hereinafter, the high power at which the apparatus of Figs. 4 and 5 operates will tend to cause vibration, and so it is highly desirable to avoid cantilever construction. The compression member or auxiliary column 24 is therefore required at the high voltage terminal end of the apparatus; and so there is very little waste space at this end. Moreover, this end space is compact electrically even though it involves a solid insulator, because the insulator is in a region of uniform field. Ordinarily, the electric field about the high voltage terminal 15 would decrease with increasing distance from the terminal 15; however, by shielding the solid insulators 25 by pairs of equipotential rings 26, and by installing equal resistors (not shown) between adjacent conducting rings 26, the voltage is equally divided between the conducting rings 26, so that a uniform electric field is produced in the vicinity of the insulators 25. This construction increases the normal gradient near the tank 18 and decreases the normal gradient near the terminal 15, but the average gradient is unchanged. This construction therefore maximizes the voltage supportable, for each increment of solid insulator has applied to it the maximum voltage it can support. Since the region near ground is thus more efficiently used than with the case of high pressure gas and a non-uniform field, this end space is of approximately equal compactness to that afforded by the high pressure and a non-uniform field.

The high voltage terminal 15 is also constructed so as to make the most efficient use of the space available. The terminal 15 comprises two parts: a cylindrical portion 28 and a metal spinning 29 for increasing the space available in the terminal 15. Because a solid insulator is less effective than a gas insulator, it is possible to thrust the high voltage terminal 15 up in this manner within the auxiliary column 24. The spinning 29 would not be exactly hemispherical: the outer surface of the spinning 29 would be constructed so as to lie as close as possible to the insulators 25 without electrical breakdown, in order to maximize the space within the terminal 15.

The main column 23 and the acceleration tube 16 are also compact units, and are used not only to produce but also to insulate the high unidirectional voltage. The main column 23 is used; (1) for the magnetic purposes of the D.C. generators; (2) for mechanical purposes as important structural elements in the D.C. generator and in the high voltage insulating column as a whole; and (3) to afford suitable distribution of the high voltage electric field between the column 23 and the tank 18. The acceleration tube 16 is used: (1) to transmit mechanical power along the column 23; (2) to form the rotating shaft for the D.C. unit generators; and (3) to change the high voltage electrical energy into kinetic energy of an electron beam or radiation energy.

At the grounded end of the apparatus, space which would otherwise be wasted is used for cooling apparatus and other equipment. A grounded metal shield 30 which is supported on a steel supporting structure 31, provides a ring-shaped region 32 which is available for cooling equipment and other apparatus. A second ring-shaped region 33 between the steel supporting structure 31 and the motor 20 is also available for this purpose; and the motor 20 itself uses space efficiently. The metal shield 30 may be shaped similarly to the spinning 29: that is, its outer surface may be so constructed so as to lie as close to the main column 23 as possible without electrical breakdown, so as to maximize the space available for useful purposes.

As hereinbefore stated, it is not necessary that the acceleration tube 16 constitute the rotor assembly of the high voltage generator; one suitable alternative to the apparatus of Figs. 4 and 5 would be a stationary acceleration tube surrounded by a hollow insulating shaft acting as the rotor assembly. However, using the acceleration tube 16 for both purposes gives compactness and combines so many advantages that it is the preferred construction. That such a construction is a suitable one appears from the following considerations.

Consider the general problem of transmission of power in D.C. accelerators. Suppose that there is a high voltage terminal, and that a high D.C. voltage is applied to the terminal in some magic way. It is desired to convert this high voltage into radiation; for this purpose, the best known apparatus is a vacuum tube in which particles are accelerated in a uniform electric field. Even with such a structure, there would be transverse corona from the vacuum tube; to prevent this, one would need conducting rings about the vacuum tube. Since the apparatus already includes a cylindrical column bounded by a series of conducting rings, it is logical to use this type of structure as the power-transmitting means. In the electrostatic belt-type generator, a belt is provided within the column and transfers mechanical power into electric power at each equipotential plane or conducting ring; the apparatus is therefore similar to numerous D.C. generators in series. In order to increase power output, one might add more belts, as has been done in some electrostatic generators. Alternatively, one might use a shaft, since a shaft is a very efficient means of power transmission; for example, it is possible to get 300,000 kilowatts from one shaft of the biggest turbo-generators now in operation.

By using the acceleration tube 16 as the shaft for power transmission, one automatically has a hollow shaft, which is more rigid and stronger than a solid shaft of equal weight. For example, in a jet engine, in which thousands of horsepower are involved in the power transmission, a shaft transmits power axially along the engine. A hollow shaft takes up little weight and space, and less than 1% of the power is lost in the transmission.

Moreover, by using the acceleration tube 16 as the shaft for power transmission, one automatically has a shaft which is in compression, since the interior of the acceleration tube 16 is evacuated and the tube 16 is immersed in an insulating gas at high pressure. This compression not only compensates the centrifugal force resulting from rotation of the tube 16, but also strengthens the glass or insulating portions of the acceleration tube.

The centrifugal force is only a fraction of the insulating gas pressure. In practice, one might use sulphur hexafluoride at 100 pounds per square inch, which would be ample to keep the tube 16 in compression both radially and longitudinally. It may be noted that, unlike the conventional electrostatic belt-type generator, which produces corona causing decomposition of sulphur-hexafluoride, the apparatus of Figs. 4 and 5 produces negligible corona.

Glass under compression not only supports a greater force before breakdown than glass under tension, but the statistical spread of the force required for breakdown, taken over a large number of samples, is narrower. Since for practical purposes one is interested in the minimum force at which breakdown might occur rather than the average force, glass under compression has a twofold advantage over glass under tension.

The construction shown in Figs. 4 and 5, wherein the main column 23 and the rotating tube 16 are supported horizontally at both ends, has definite advantages over a vertical construction with the main column 23 and the rotating tube 16 in cantilever. Cantilever leads to vibration, whereas the longitudinal compression provided by the contraction of Figs. 4 and 5 strengthens the tube 16 as noted hereinbefore and also the main column 23. The horizontal construction not only takes care of vibration by virtue of having the tube 16 and the column 23 in compression, but it also takes care of the torque which results from the electromagnetic pull on the main column 23. A vertical construction in cantilever would be much less satisfactory in taking care of this torque, particularly since it is not a small, continuous torque, but rather a torque which leads to vibrations.

Although in the foregoing detailed description reference has been made to electron acceleration, this invention would also be especially valuable for applications in nuclear science and technology, as it could produce both a very powerful and highly monoenergetic positive ion beam.

For the design of the generator shown in Fig. 1 it has been mentioned that the material having permanent magnetism should be laminated. In an alternative design, however, the magnetic flux through the permanent magnet element could be made steady, so that this permanent magnet element could then be made solid and unlaminated. In this design the movement of the toothed rotor would cause the magnetic flux from the permanent magnet to change its path back and forth between two branches of the magnetic circuit in such a way that an alternating E.M.F. would be introduced into the coils surrounding these branches of the magnetic circuit.

In the design shown in the figures, for simplicity it is indicated that the rotating acceleration tube has bearings only at each end. If needed, an additional intermediate bearing or bearings could be added.

Having thus described the principles of the invention, together with several embodiments thereof, it is to be understood that although specific terms are employed they are used in a generic and descriptive sense and not for purposes of limitation, the scope of the invention being set forth in the following claims.

We claim:

1. A unit for the generation of unidirectional-voltage power comprising in combination a plurality of coils; a plurality of stator elements of magnetized magnetic material each forming a mutually independent open magnetic circuit which links at least one coil; a rotor element of magnetic material adapted, upon rotation thereof, to produce rapid variations in the reluctance of said magnetic circuits by alternately opening and closing the same; means for rotating said rotating element, whereby an alternating electromotive force is generated in each coil; and means for rectifying the alternating electromotive forces so generated.

2. A unidirectional voltage generator unit comprising in combination a plurality of coils; a plurality of stator elements of magnetized magnetic material each forming a mutually independent open magnetic circuit which links at least one coil; a rotor element of magnetic material adapted, upon rotation thereof, to produce rapid variations in the reluctance of said magnetic circuits by alternately opening and closing the same; means for rotating said rotating element, whereby an alternating electromotive force is generated in each coil; means for rectifying separately the alternating-current output of each coil; and means for connecting the resulting direct-current outputs from each coil in series.

3. A unidirectional high voltage generator comprising in combination a plurality of alternate unidirectional voltage generator units and insulating sections, each unit comprising in combination a plurality of coils, a plurality of stator elements of magnetized magnetic material each forming a mutually independent open magnetic circuit which links at least one coil, a rotor element of magnetic material adapted, upon rotation thereof, to produce rapid variations in the reluctance of said magnetic circuits by alternately opening and closing the same, and means for rectifying separately the alternating-current output of each coil; each insulating section comprising at least one inner insulator mechanically connecting adjacent rotor elements of magnetic material and at least one outer insulator mechanically connecting magnetized stator elements to adjacent magnetized stator elements of adjacent units; said rotor elements and inner insulators thus forming a rotor assembly; means for rotating said rotor assembly, whereby an alternating electromotive force is generated in each coil by virtue of variations in the reluctance of the magnetic circuit linking such coil; and means for connecting the resultant direct-current outputs from each coil in series.

4. A unidirectional high voltage generator in accordance with claim 3, wherein the direct-current outputs from each coil are connected in series but out of phase with one another, whereby ripple is reduced.

5. A unidirectional-high-voltage charged-particle accelerator comprising in combination a plurality of unidirectional voltage generator units, each unit comprising in combination a plurality of coils, a plurality of stator elements of magnetized magnetic material each forming a mutually independent open magnetic circuit which links at least one coil, a rotor element of magnetic material adapted, upon rotation thereof, to produce rapid variations in the reluctance of said magnetic circuits by alternately opening and closing the same, and means for rectifying separately the alternating-current output of each coil; an acceleration tube comprising a plurality of alternating magnetic and insulating sections, each of said magnetic sections being a rotor element of one of said unidirectional voltage generator units; a plurality of insulators mechanically connecting magnetized stator elements to adjacent magnetized stator elements of adjacent units; means for rotating said acceleration tube, whereby an alternating electromotive force is generated in each coil; and means for connecting the resultant direct-current outputs from each coil in series in such phase relationship as to reduce ripple.

6. A high voltage source comprising in combination: (1) a column having a grounded member at one end and a terminal at the other end, said column comprising a plurality of disk-like structures built axially in compression and insulated from one another in such a manner as to form a rotatable hollow shaft within a stationary portion, each of said disk-like structures including D.C. generator means operated by rotation of said shaft; (2) means for rotating said shaft, whereby mechanical power is transmitted along the whole length of the column; and (3) means for connecting said D.C. generating means in series, whereby the mechanical power of shaft rotation is converted into electrical power at appropriate voltages and high voltage is generated at said terminal.

7. A high voltage source comprising in combination: (1) a column having a grounded member at one end and a terminal at the other end, said column comprising a plurality of disk-like structures each comprising two concentric members, the outer of which is stationary and the inner of which is rotatable, built axially in compression and insulated from one another in such a manner as to form a rotatable hollow shaft within a stationary portion, each of said disk-like structures including D.C. generator means operated by rotation of said shaft; (2) means for rotating said shaft, whereby mechanical power is transmitted along the whole length of the column; and (3) means for connecting said D.C. generating means in series, whereby the mechanical power of shaft rotation is converted into electrical power at appropriate voltages and high voltage is generated at said terminal; said disk-like structures being constructed largely of laminated magnetic material, so that their mechanical shape and strength is such that they are components in an exceedingly strong and rigid column structure which in compression can handle large amounts of power and with a minimum amount of vibration.

8. A high voltage source comprising in combination: (1) a column having a grounded member at one end and a terminal at the other end, said column comprising a plurality of disk-like structures each comprising two concentric members, the outer of which is stationary and the inner of which is rotatable, built axially in compression and insulated from one another in such a manner as to form a rotatable hollow shaft within a stationary portion, each of said disk-like structures including D.C. generating means operated by rotation of said shaft; (2) means for rotating said shaft, whereby mechanical power is transmitted along the whole length of the column; (3) means for connecting said D.C. generating means in series, whereby the mechanical power of shaft rotation is converted into electrical power at appropriate voltages and high voltage is generated at said terminal; and (4) a grounded structure surrounding said column and containing compressed gas, the rim of said disk-like structures providing an electric field control suitable for obtaining high voltage insulation across said compressed gas.

9. A radiation source comprising in combination: (1) a column having a grounded member at one end and a terminal at the other end, said column comprising a plurality of disk-like structures each comprising two concentric members, the outer of which is stationary and the inner of which is rotatable, built axially in compression and insulated from one another in such a manner as to form a rotatable hollow shaft within a stationary portion, each of said disk-like structures including D.C. generating means operated by rotation of said shaft; (2) means for rotating said shaft, whereby mechanical power is transmitted along the whole length of the column; (3) means for connecting said D.C. generating means in series, whereby the mechanical power of shaft rotation is converted into electrical power at appropriate voltages and high voltage is generated at said terminal; (4) a source of charged particles; and (5) means for accelerating charged particles along the axis of the hollow shaft by virtue of the electric field about said terminal, whereby the high voltage electrical power is turned into kinetic energy of the charged particles.

10. A radiation source comprising in combination: (1) a column having a grounded member at one end and a terminal at the other end, said column comprising a plurality of disk-like structures built axially in compression and insulated from one another in such a manner as to form a rotatable highly evacuated hollow shaft within a stationary portion, said disk-like structures being constructed largely of laminated magnetic material, so that their mechanical shape and strength is such that they are components in an exceedingly strong and rigid column structure which in compression can handle large amounts of power and with a minimum amount of vibration, each of said disk-like structures including D.C. generating means operated by rotation of said shaft; (2) means for rotating said shaft, whereby mechanical power is transmitted along the whole length of the column; (3) means for connecting said D.C. generating means in series, whereby the mechanical power of shaft rotation is converted into electrical power at appropriate voltages and high voltage is generated at said terminal; (4) a source of charged particles; (5) means for releasing charged particles from said source of charged particles along the axis of the hollow shaft, whereby the high voltage electrical power is turned into kinetic energy of the charged particles; and (6) a grounded structure surrounding said column and containing compressed gas, the rim of said disk-like structures providing an electric field control suitable for obtaining high voltage insulation across said compressed gas.

11. A radiation source comprising in combination: (1) a column having a grounded member at one end and a terminal at the other end, said column comprising a plurality of disk-like structures built axially in compression and insulated from one another in such a manner as to form a rotatable hollow shaft within a stationary portion, each of said disk-like structures including D.C. generating means operated by rotation of said shaft; (2) means for rotating said shaft, whereby mechanical power is transmitted along the whole length of the column; (3) means for connecting said D.C. generating means in series, whereby the mechanical power of shaft rotation is converted into electrical power at appropriate voltages and high voltage is generated at said terminal; (4) a source of charged particles; (5) a stationary high-voltage high-vacuum acceleration tube supported within said hollow shaft and adapted to convert the high voltage electrical power into kinetic energy of the charged particles; and (6) a grounded structure surrounding said column and containing compressed gas, the rim of said disk-like structures providing an electric field control suitable for obtaining high voltage insulation across said compressed gas.

12. Apparatus in accordance with claim 10, wherein each of said disk-like structures includes a plurality, $n$, of coils in each of which an alternating current is generated out of phase with the alternating current generated in other coils, and where the A.C. output of each coil is separately rectified, whereby an $n$-fold reduction in ripple is achieved.

13. A unidirectional voltage generator unit comprising in combination a multiplicity of coils; a multiplicity of magnetized stator elements of magnetic material each forming an open magnetic circuit which links at least one coil; a rotor element of magnetic material adapted, upon rotation thereof, to produce rapid variations in the reluctance of said magnetic circuits by alternately opening and closing the same; means for rotating said rotating element, whereby an alternating electromotive force is generated in each coil; means for rectifying separately the alternating-current output of each coil; and means for connecting the resulting direct-current outputs from each coil in series in such phase relationship as to reduce ripple to a minimum.

14. A unidirectional high-voltage generator comprising in combination a shaft including a series of axially spaced rotor elements of magnetic material, each rotor element having a corrugated periphery; a series of magnetized stator elements of magnetic material spaced radially from and coacting with said rotor elements to form a series of magnetic circuits, said stator elements being adapted to have produced in at least a portion thereof a magnetic flux which varies in response to rotation of said shaft; a series of coils surrounding said portions of said magnetic circuits; means for rotating said shaft, whereby an alternating E.M.F. is produced in said coils; means for rectifying the outputs of said coils; and means for connecting the rectified outputs of said coils in series.

15. Apparatus for the acceleration of charged particles comprising in combination a shaft including a series of axially spaced rotor elements of magnetic material, each rotor element having a corrugated periphery; a series of magnetized stator elements of magnetic material spaced radially from and coacting with said rotor elements to form a series of magnetic circuits, said stator elements being adapted to have produced in at least a portion thereof a magnetic flux which varies in response to rotation of said shaft; a series of coils surrounding said portions of said magnetic circuits; means for rotating said shaft, whereby an alternating E.M.F. is produced in said coils; means for rectifying the outputs of said coils; means for connecting the rectified outputs of said coils in series; a source of charged particles; an acceleration tube adapted to accelerate charged particles from said source of charged particles upon application of a voltage difference between the extremities thereof; and means to apply the series-connected output of said coils between the extremities of said acceleration tube.

16. Apparatus in accordance with claim 15, wherein said acceleration tube comprises a multiplicity of alternating electrode disks and insulating rings, and wherein electrode disks of the acceleration tube are electrically connected to corresponding points of said series connection of coils.

17. A unidirectional high voltage generator comprising in combination a pair of terminals between which high voltage is to be generated, a plurality of similarly-oriented rectifiers and conductors alternating therewith connected in series between said terminals, and means for producing pulsating magnetic flux in the vicinity of each of said conductors so as to be linked thereby.

References Cited in the file of this patent

UNITED STATES PATENTS

| | | |
|---|---|---|
| 678,302 | Moore | July 9, 1901 |
| 1,659,729 | Gannett | Feb. 21, 1928 |
| 1,898,728 | Huff | Feb. 21, 1933 |
| 1,998,409 | Klaiber | Apr. 16, 1935 |
| 2,138,160 | Hansell | Nov. 29, 1938 |
| 2,330,991 | Newton | Oct. 5, 1943 |
| 2,671,882 | Page | Mar. 9, 1954 |
| 2,675,427 | Newby | Apr. 13, 1954 |